United States Patent Office 2,999,115
Patented Sept. 5, 1961

---

2,999,115
β-TRINITROETHYLPHENYLAMINE
Robert H. Saunders, West Chester, Pa., assignor, by mesne assignments, to the United States of America as represented by the Secretary of the Navy
No Drawing. Filed May 7, 1952, Ser. No. 286,602
1 Claim. (Cl. 260—577)

This invention relates to a new compound, β-trinitroethylphenylamine.

The new compound of the invention is an orange colored solid which is stable at room temperature. It has a sensitivity to impact slightly greater than that of TNT. The compound was found to have great utility as an intermediate in the preparation of trinitroethyl trinitrophenyl nitramine, an excellent explosive, disclosed and claimed in application Serial No. 286,596, filed May 7, 1952, by Delore L. Kouba.

The new compound may be prepared by condensation of aniline with trinitroethanol. The reaction is carried out by chilling and adding water, accompanied by agitation. The product is recovered by recrystallization from a methanol-water solution.

It is an object of the invention to provide a new compound, β-trinitroethylphenylamine.

The invention is illustrated by the following example, but is not limited thereto:

Example.—2.75 grams of trinitroethanol in 15 milliliters of methanol were added to 1 gram of aniline in 10 milliliters of methanol. A small amount of water was added and the mixture chilled. An orange precipitate formed from which the product was recovered by recrystallization from a methanol-water solution. The compound has the following formula:

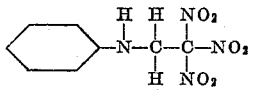

The percentage composition calculated for $C_8H_8N_4O_6$ is, 37.5 percent carbon, 3.1 percent hydrogen, 21.8 percent nitrogen and the remainder oxygen. Analysis of the compound gave 37.5 percent carbon, 2.9 percent hydrogen and 20.3 percent nitrogen. Its melting point is 48° C. It has an oxygen balance of −88. The compound has an impact sensitivity of 70 as determined with the Bureau of Mines impact machine, this figure being the distance in centimeters a 2 kilogram weight was required to fall in order to produce 50% shots.

It is thus seen from the above that there has been provided a new compound having utility as an intermediate in the preparation of a useful explosive compound.

What is claimed is:
β-Trinitroethylphenylamine.

References Cited in the file of this patent
UNITED STATES PATENTS 2,292,212   Dickey et al. _____ Aug. 4, 1942

OTHER REFERENCES

Desvergnes: Chem. Abstr., vol. 22 (1928), page 1963.